E. MERRY.
Animal Trap.

No. 231,833. Patented Aug. 31, 1880.

WITNESSES
John A. Ellis
Frank J. Masi

INVENTOR
Eugene Merry,
by E. W. Anderson
his ATTORNEY

UNITED STATES PATENT OFFICE.

EUGENE MERRY, OF GLENS FALLS, NEW YORK.

ANIMAL-TRAP.

SPECIFICATION forming part of Letters Patent No. 231,833, dated August 31, 1880.

Application filed December 6, 1879.

*To all whom it may concern:*

Be it known that I, EUGENE MERRY, of Glens Falls, in the county of Warren and State of New York, have invented a new and valuable Improvement in Animal-Traps; and I do hereby declare that the following is a full, clear, and exact description of the construction and operation of the same, reference being had to the annexed drawings, making a part of this specification, and to the letters and figures of reference marked thereon.

Figure 1:
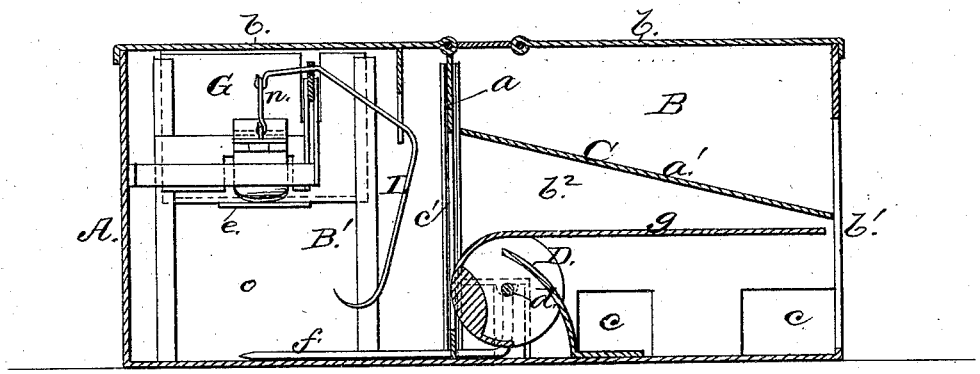
Figure 2:
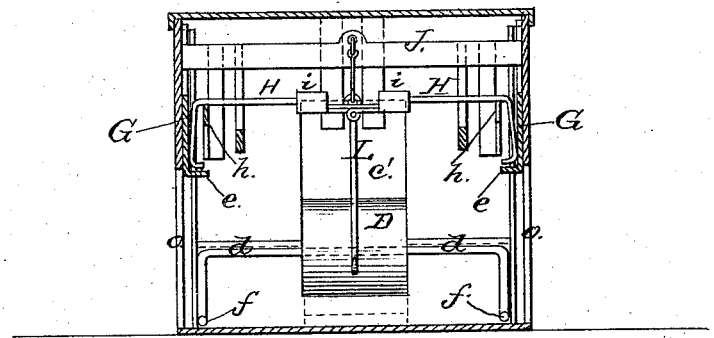

Figure 1 of the drawings is a representation of a longitudinal vertical central section of my trap, and Fig. 2 is a cross-sectional view thereof.

This invention relates to certain improvements in that class of animal-traps known as "victim-set traps;" and it consists in a trap constructed in two compartments, of one or more sliding doors in one compartment, and of a covered way in the other compartment, provided with a movable platform attached to a drum, which is provided with mechanism for raising the doors as the animal passes from one compartment to the other, in combination with certain weighted spring-latches adapted to automatically bear against the doors when elevated and hold them in position, and mechanism for tripping said latches to drop the doors, as hereinafter shown and described.

In the annexed drawings, A designates the body of the trap, the same being an oblong rectangular metallic box provided with a transverse partition, $a$, dividing it into two equal or nearly equal chambers, and with hinged covers $b$, corresponding to each of said chambers, and allowing access thereto.

Inside of the prison-chamber B is a covered way, C, extending from the partition $a$ to its slotted or perforated end wall, $b'$, and having an inclined roof, $a'$, and vertical side walls, $b^2$, wherein are made doorways $c$. The partition $a$ has in it a doorway, $c'$, of the same dimensions as the adjoining end of the covered way aforesaid. At this doorway, at the entrance to the covered way C, is a drum, D, fixed upon a shaft, $d$, arranged in suitable bearings at each side. This shaft is carried at each end outward nearly to the wall of the trap, is then bent downward nearly to its bottom, and extended horizontally about half-way past the entrance-openings $o$, which admit the animal to the trap. These openings are in the side walls, B', of the trap-chamber, and are closed by vertically-sliding doors G, arranged after the manner of a sash, and provided at their lower edge with an inwardly-projecting flange, $e$. The horizontally-projecting arms $f$ of the shaft $d$ reach under these flanges.

Attached to drum D is a platform, $g$, extending back into the covered way nearly to the slatted wall of the prison-chamber, and having free movement therein. This platform is overbalanced by the weight of the arms $f$. Consequently in its normal position its free end is nearly in contact with the roof of the covered way.

The doors G are locked in the raised position by means of the angular latches H, arranged horizontally in the trap-chamber near its roof. These latches are hinged together at their inner ends, and supported near their bends by the metallic hangers $h$, their vertical branches being extended down nearly or quite to the upper edge of the entrance-openings, so as to bear against the doors G when said latches are in a set position, as shown in Fig. 2. They are also weighted near their hinged ends, as shown at $i$, Fig. 2.

J indicates a fulcrum-bar extending across the trap-chamber, somewhat higher than the latches, upon which is pivoted the trigger L. This is a sufficiently-stout angular wire having at its lower end a hook for the attachment of a bait, and permanently connected by a short link, $n$, to the joint of the latches H.

The trap is set by pressing down upon the free end of the platform. This raises the doors and thrusts them between the side of the trap and the vertical branch of the latches, which, being weighted at their hinged end, flex downward at their center, and by bearing with their free ends against the doors hold them up. The animal, having entered the trap, seizes upon the bait, and by drawing upon the trigger causes the latches to flex upward. This releases the doors G, which immediately drop. The animal seeks the only exit—that above the drum in the covered way—and passes on to the platform, which tilts under its weight and discloses the openings $c$ in said way. Decoyed by the light, he rushes through one of them into the prison-chamber. The platform now resumes its normal position, and the animal is safely captured. The tilting of the platform under the weight of the animal reopens the doors.

I am aware that traps having sliding doors raised and set by a drop-platform, and released by drawing upon the bait, are not new, and I do not claim such devices, broadly.

What I claim as new, and desire to secure by Letters Patent, is—

The combination, in an animal-trap, with the prison-chamber B, having the longitudinal covered way C, provided with openings c in its sides, the swinging platform g, and the balancing-arms f, extending into the trap-chamber under its sliding doors G, of the transverse angular latches H, flexibly connected at their inner ends, the weights i near said ends, the sliding doors G, engaging said latches, the vibrating trigger-lever L, and the link n, connecting the weight end of said lever with the joined ends of said latches, substantially as specified.

In testimony that I claim the above I have hereunto subscribed my name in the presence of two witnesses.

EUGENE MERRY.

Witnesses:
CHAUNCEY M. ORTON,
WM. A. MERRY.